United States Patent
Jennings

(10) Patent No.: US 10,060,272 B2
(45) Date of Patent: Aug. 28, 2018

(54) TURBINE VANE WITH LOAD SHIELD

(71) Applicant: Rolls-Royce Corporation, Indianapolis, IN (US)

(72) Inventor: Aaron P. Jennings, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 283 days.

(21) Appl. No.: 15/007,991

(22) Filed: Jan. 27, 2016

(65) Prior Publication Data

US 2016/0222822 A1 Aug. 4, 2016

Related U.S. Application Data

(60) Provisional application No. 62/109,689, filed on Jan. 30, 2015.

(51) Int. Cl.
*F01D 5/14* (2006.01)
*F01D 5/18* (2006.01)
*F01D 5/28* (2006.01)
*F01D 9/04* (2006.01)

(52) U.S. Cl.
CPC .............. *F01D 5/284* (2013.01); *F01D 5/147* (2013.01); *F01D 5/187* (2013.01); *F01D 9/041* (2013.01); *F05D 2240/12* (2013.01); *F05D 2240/123* (2013.01); *F05D 2240/124* (2013.01); *F05D 2300/20* (2013.01); *F05D 2300/6033* (2013.01); *Y02T 50/672* (2013.01); *Y02T 50/673* (2013.01)

(58) Field of Classification Search
CPC .......... F01D 5/147; F01D 5/187; F01D 5/284; F01D 9/041; F05D 2240/123; F05D 2240/124; F05D 2300/6033
See application file for complete search history.

(56) References Cited

U.S. PATENT DOCUMENTS

| | | | |
|---|---|---|---|
| 4,786,234 A * | 11/1988 | Readnour | F01D 5/147 415/115 |
| 5,090,866 A | 2/1992 | Blair et al. | |
| 5,332,357 A | 7/1994 | Tubbs | |
| 5,358,379 A | 10/1994 | Pepperman et al. | |
| 5,630,700 A | 5/1997 | Olsen et al. | |
| 5,827,045 A * | 10/1998 | Beeck | F01D 5/284 416/224 |
| 6,200,092 B1 | 3/2001 | Koschier | |
| 6,514,046 B1 | 2/2003 | Morrison et al. | |
| 7,093,359 B2 | 8/2006 | Morrison et al. | |
| 7,094,021 B2 | 8/2006 | Haubert | |
| 7,316,539 B2 | 1/2008 | Campbell | |
| 7,445,432 B2 | 11/2008 | Levine et al. | |
| 7,452,182 B2 | 11/2008 | Vance et al. | |
| 7,607,287 B2 | 10/2009 | Reba et al. | |
| 7,648,336 B2 | 1/2010 | Cairo | |
| 7,837,438 B2 | 11/2010 | Campbell | |

(Continued)

*Primary Examiner* — Jason Shanske
*Assistant Examiner* — Christopher R Legendre
(74) *Attorney, Agent, or Firm* — Barnes & Thornburg LLP

(57) ABSTRACT

A turbine vane for use in a gas turbine engine is disclosed. The turbine vane includes an inner platform, an outer platform spaced from the inner platform, and an airfoil that extends from the inner platform to the outer platform. The airfoil includes a ceramic-containing web that forms a portion of the airfoil and a metallic load shield that forms another portion of the airfoil.

20 Claims, 1 Drawing Sheet

(56) References Cited

U.S. PATENT DOCUMENTS

| | | |
|---|---|---|
| 7,963,745 B1 | 6/2011 | Liang |
| 8,033,790 B2 | 10/2011 | Vance |
| 8,197,211 B1 | 6/2012 | Liang |
| 8,206,098 B2 | 6/2012 | Prill et al. |
| 8,292,580 B2 | 10/2012 | Schiavo et al. |
| 8,366,392 B1 * | 2/2013 | Liang .................... F01D 5/147 |
| | | 416/96 A |
| 9,528,382 B2 * | 12/2016 | Morgan ................ F01D 5/147 |
| 2012/0301312 A1 | 11/2012 | Berczik et al. |
| 2013/0251536 A1 | 9/2013 | Mironets et al. |
| 2016/0222806 A1 * | 8/2016 | Jennings ................ F01D 9/065 |
| 2016/0222822 A1 * | 8/2016 | Jennings ................ F01D 5/284 |
| 2017/0254207 A1 * | 9/2017 | Schetzel ................ B23P 15/04 |

\* cited by examiner

TURBINE VANE WITH LOAD SHIELD

CROSS REFERENCE TO RELATED APPLICATIONS

This application claims priority to and the benefit of U.S. Provisional Patent Application No. 62/109,689, filed 30 Jan. 2015, the disclosure of which is now expressly incorporated herein by reference.

FIELD OF THE DISCLOSURE

The present disclosure relates generally to vanes for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor, In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane for use in a gas turbine engine disclosed in this paper. The turbine vane may include an inner platform, an outer platform spaced from the inner platform, and an airfoil that extends from the inner platform to the outer platform.

In illustrative embodiments, the airfoil may include a ceramic-containing web that forms a suction side of the airfoil and a metallic load shield that forms a pressure side of the airfoil. The metallic load shield may be arranged adjacent to the ceramic-containing web to form a cooling channel between ceramic-containing web and the metallic load shield. The cooling channel may extend over substantially the entire distance from the inner platform to the outer platform and from a leading edge of the airfoil to a trailing edge of the airfoil.

In illustrative embodiments, the metallic load shield may be formed to include a first cooling air inlet port defined by a thinned section of the metallic load shield that extends from at least one of the inner platform and the outer platform to the cooling channel. The first cooling air inlet port may be sized to conduct cooling air to the cooling channel during use of the turbine vane.

In illustrative embodiments, the first cooling air inlet port may be arranged in a midspan region of the airfoil between the leading edge and the trailing edge of the airfoil at a location exposed to high temperatures when the turbine vane is used. In some embodiments, the metallic load shield may include cooling features arranged in the first cooling air inlet port that increase surface area of the metallic load shield along the first cooling air inlet port so that heat is dissipated through the cooling features by cooling air flowing through the first cooling air inlet port. The cooling features may include at least one of ribs, pins, slots, and bumps.

In illustrative embodiments, the metallic load shield may be formed to include a second cooling air inlet port spaced apart from the first cooling air inlet port. The second cooling air inlet port may be defined by a thinned section of the metallic load shield that extends from at least one of the inner platform and the outer platform to the cooling channel sized to conduct cooling air to the cooling channel during use of the turbine vane.

In illustrative embodiments, the first cooling air inlet port and the second cooling air inlet port may be arranged in a midspan region of the airfoil between the leading edge and the trailing edge of the airfoil at locations exposed to high temperatures when the turbine vane is used. The metallic load shield may include cooling features arranged in the first cooling air inlet port and in the second cooling air inlet port that increase surface area of the metallic load shield along the first and the second cooling air inlet ports so that heat is dissipated through the cooling features by cooling air flowing through the first and the second cooling air inlet ports.

In illustrative embodiments, the turbine vane may include a restrictor plate. The restrictor plate may be arranged at the end of the first cooling air inlet port and the second cooling air inlet port adjacent to the inner platform or the outer platform. The restrictor plate may be formed to include a first restriction port in fluid communication with the first cooling air inlet port and sized to cause a first pressure to be established within the first cooling air inlet port by cooling air supplied to the first cooling air inlet port. The restrictor plate may be formed to include a second restriction port in fluid communication with the second cooling air inlet port and sized to cause a second pressure to be established within the second cooling air inlet port by cooling air supplied to the second cooling air inlet port.

In illustrative embodiments, a leading edge interface of the metallic load shield and the ceramic-containing web may be arranged to discharge cooling air from the cooling channel at a location that creates a cooling air film along at least a portion of the suction side of the airfoil during use of the turbine vane in a gas turbine engine.

In illustrative embodiments, a trailing edge interface of the metallic load shield and the ceramic-containing web may be arranged to discharge cooling air from the cooling channel along the trailing edge of the airfoil during use of the turbine vane in a gas turbine engine.

In illustrative embodiments, the metallic load shield may be formed to include bleed holes that extend from the cooling channel to the pressure side of the airfoil. The bleed holes may conduct cooling air out of the cooling channel during use of the turbine vane in a gas turbine engine.

According to another aspect of the present disclosure, an airfoil adapted for use in a gas turbine engine is taught. The airfoil may include a ceramic-containing web that forms a suction side of the airfoil, and a metallic load shield that forms a pressure side of the airfoil.

In illustrative embodiments, the metallic load shield may be arranged adjacent to the ceramic-containing web to form a cooling channel between ceramic-containing web and the metallic load shield. The cooling channel may extend from a leading edge of the airfoil to a trailing edge of the airfoil.

In illustrative embodiments, the metallic load shield may be formed to include a first cooling air inlet port. The first cooling air inlet port may be defined by a thinned section of the metallic load shield that extends from at least one of the inner platform and the outer platform to the cooling channel sized to conduct cooling air to the cooling channel during use of the turbine vane.

In illustrative embodiments, the first cooling air inlet port may be arranged in a midspan region of the airfoil between the leading edge and the trailing edge of the airfoil at a location exposed to high temperatures when the turbine vane is used.

In illustrative embodiments, the metallic load shield may be formed to include a second cooling air inlet port spaced apart from the first cooling air inlet port. The second cooling air inlet port may be defined by a thinned section of the metallic load shield that extends from at least one of the inner platform and the outer platform to the cooling channel sized to conduct cooling air to the cooling channel during use of the turbine vane.

In illustrative embodiments, the first cooling air inlet port and the second cooling air inlet port may be arranged in a midspan region of the airfoil between the leading edge and the trailing edge of the airfoil at locations exposed to high temperatures when the turbine vane is used.

In illustrative embodiments, the metallic load shield may include cooling features arranged in the first cooling air inlet port and in the second cooling air inlet port that increase surface area of the metallic load shield along the first and the second cooling air inlet ports so that heat is dissipated through the cooling features by cooling air flowing through the first and the second cooling air inlet ports.

According to another aspect of the present disclosure, a method of assembling a turbine vane for use in a gas turbine engine is taught. The method may include arranging a ceramic-containing web adjacent to a metallic load shield so that the ceramic-containing web and the metallic load shield cooperate to form an airfoil. The method may also include coupling the airfoil to an inner platform and an outer platform so that the airfoil extends across a gas path defined between the inner platform and the outer platform.

In illustrative embodiments, the metallic load shield may be arranged relative to the ceramic-containing web to form a cooling channel between ceramic-containing web and the metallic load shield. The cooling channel may extend over substantially the entire distance from the inner platform to the outer platform and from a leading edge of the airfoil to a trailing edge of an airfoil.

In illustrative embodiments, the ceramic-containing web may form a suction side of the airfoil. The metallic load shield may form a pressure side of the airfoil.

These and other features of the present disclosure will become more apparent from the following description of the illustrative embodiments.

DETAILED DESCRIPTION OF THE DRAWINGS

Figure 1:
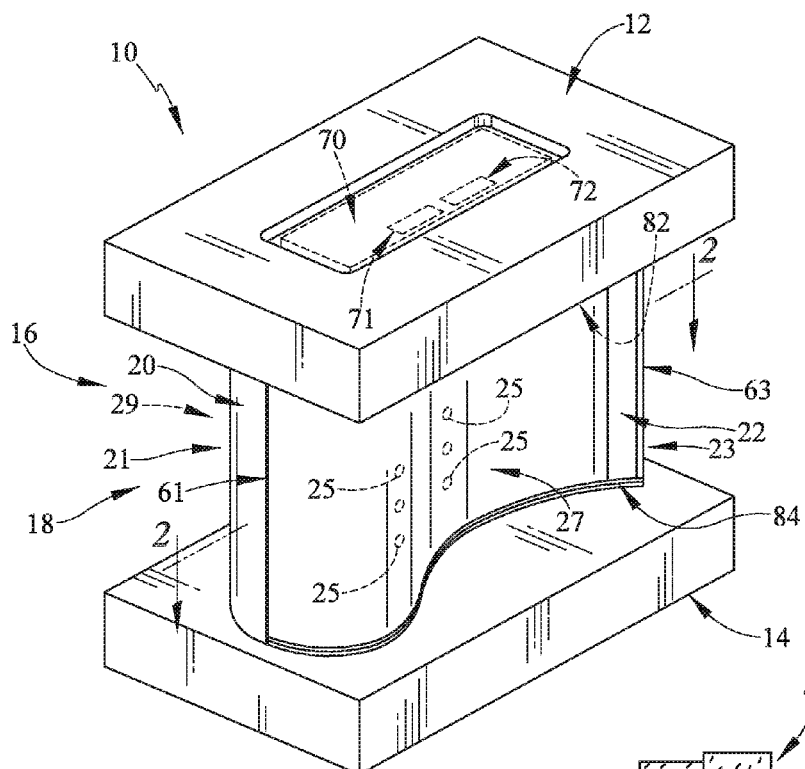
FIG. 1 is perspective view of a turbine vane adapted for use in a gas turbine engine showing that the turbine vane includes an inner platform, an outer platform, and an airfoil that extends from the inner platform to the outer platform.

For the purposes of promoting an understanding of the principles of the disclosure, reference will now be made to a number of illustrative embodiments illustrated in the drawings and specific language will be used to describe the same.

An illustrative turbine vane assembly 10 for use in a gas turbine engine is shown in FIG. 1. The turbine vane 10, sometimes simply called a turbine vane 10, includes an inner platform 12, an outer platform 14, and an airfoil 16. The inner platform 12 and outer platform 14 are spaced apart in a radial direction R from one another and cooperate to define a flow path 18 for hot high pressure gasses moving through the turbine section of a gas turbine engine. The airfoil 16 extends from the inner platform 12 to the outer platform 14 across a gas path defined therebetween.

The airfoil 16 extends across the flow path 18 to interact with the hot gasses moving through the flow path 18 and is shaped to redirect the hot gasses before those gasses act on rotating blades of the turbine section as suggested in FIG. 1. The airfoil 16 illustratively incorporates a ceramic-containing web 20, a metallic load shield 22, and cooling air passages 30, 40, 50 to help withstand high temperatures of the gasses passing over the airfoil 16. The ceramic-containing web 20 comprises a high-temperature resistant material and illustratively forms a suction side 29 of the airfoil 16. The exemplary metallic load shield 22 forms a pressure side 27 of the airfoil 16 that directly redirects hot gasses moving through the flow path 18.

Figure 2:
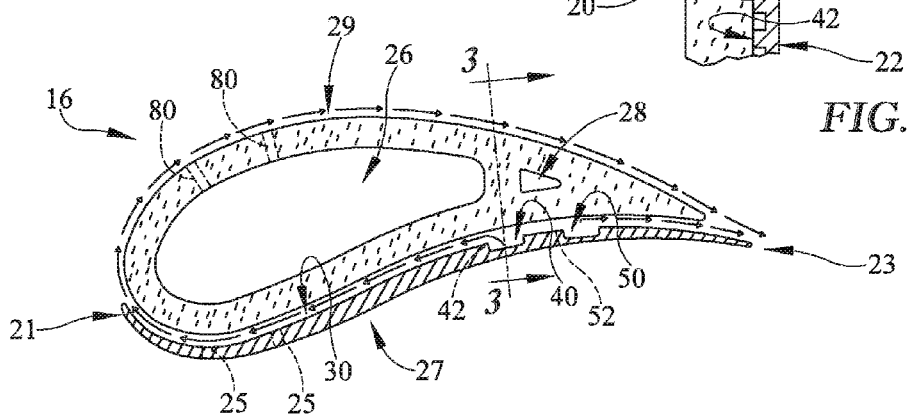
FIG. 2 is a cross sectional view of the turbine vane of FIG. 1 taken at line 2-2 showing that the airfoil includes a ceramic-containing web that provides a suction side of the airfoil and a metallic load shield that provides a pressure side of the airfoil and showing that a cooling channel is formed between the ceramic-containing web and the metallic load shield to conduct cooling air through the airfoil.

The metallic load shield 22 illustratively provides means for reacting load applied to the pressure side 27 of the airfoil 16 when the airfoil 16 is acted upon by high-temperature gasses as shown in FIGS. 1 and 2. Accordingly, the ceramic-containing web 20 need not be designed to individually react this loading.

The ceramic-containing web 20 and the metallic load shield 22 are arranged adjacent to one another and cooperate to form a cooling channel 30 adapted to conduct cooling air through the airfoil 16 as shown in FIG. 2. The cooling channel 30 illustratively extends over substantially the entire distance from the inner platform 12 to the outer platform 14 and from a leading edge 21 of the airfoil 16 to a trailing edge 23 of the airfoil 16.

The cooling channel 30 is illustratively fed cooling air from a cooling air inlet ports 40, 50 defined by thinned sections 41, 51 of the metallic load shield 22 as shown in FIG. 2. Each cooling air inlet port 40, 50 illustratively extends from the inner platform 12 to the outer platform 14 and opens into the cooling channel 30. The cooling air inlet ports 40, 50 are are sized to conduct cooling air to the cooling channel 30 during use of the turbine vane 10.

Figure 3:
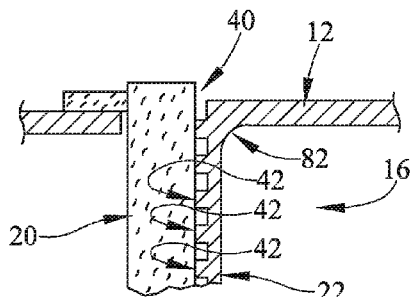
FIG. 3 is a cross sectional view of a portion of the turbine vane of FIG. 2 taken at line 3-3 showing cooling features formed by the metallic load shield arranged in a cooling air inlet port that feeds the cooling channel during use of the turbine vane.

In the illustrative embodiment, the cooling air inlet ports 40, 50 are arranged in a midspan region of the airfoil 16 between the leading edge 21 and the trailing edge 23 of the airfoil 16 at locations exposed to high temperatures when the turbine vane 10 is used as shown in FIG. 2. Cooling features 42, 52 included in the metallic load shield 22 are arranged in the cooling air inlet ports 40, 50 to dissipate heat at predetermined locations along the metallic load shield 22 as shown in FIGS. 2 and 3. The cooling features 42, 52 and in the cooling air inlet ports increase surface area of the metallic load shield 22 along the first and the second cooling air inlet ports 40, 50 so that heat is dissipated through the cooling features 42, 52 by cooling air flowing through the first and the second cooling air inlet ports 40, 50. The exemplary cooling features 42, 52 are ribs but may be pins, bumps, slots, or other features in other embodiments. In some embodiments, cooling features similar to features 42, 52 may extend along the substantially all of an interior surface of the metallic load shield 22 facing the cooling channel 30 to increase the surface area exposed to cooling air during use of the turbine vane 10.

Cooling air supplied to the cooling channel 30 via a forward-located cooling air inlet port 40 illustratively moves forward toward the leading edge 21 of the airfoil 16 and is discharged through a leading edge interface 61 of the metallic load shield 20 and the ceramic-containing web 22 as shown in FIG. 2. The leading edge interface 61 is illustratively arranged to discharge cooling air from the cooling channel 30 at a location that creates a cooling air film along at least a portion of the suction side 29 of the airfoil during use of the turbine vane 10 in a gas turbine engine.

Cooling air supplied to the cooling channel 30 via an aft-located cooling air inlet port 50 illustratively moves aft toward the trailing edge 23 of the airfoil 16 and is discharged through a trailing edge interface 63 of the metallic load shield 20 and the ceramic-containing web 22 as shown in FIG. 2. The trailing edge interface 63 is illustratively arranged to discharge cooling air from the cooling channel along the trailing edge 23 of the airfoil 16 during use of the turbine vane 10 in a gas turbine engine.

In the illustrative embodiment, the ceramic-containing web 20 is a composite component adapted to withstand very high operating temperatures that might not be possible for metallic components. More specifically, the ceramic-containing web 20 comprises a ceramic matrix composite (CMC). Even more particularly, the ceramic-containing web 20 is made from a SiC-SiC ceramic matrix composite including a silicon carbide matrix and silicon carbide fibers. For purposes of this application, a ceramic-containing material is any monolithic ceramic or composite in which at least one constituent is a ceramic. The exemplary ceramic-containing load shield 20 extends through the platforms 12, 14 as suggested in FIG. 3 to allow for expansion and contraction of the ceramic-containing web 20 at a rate different from that of the metallic components of the turbine vane 10.

Illustratively, the ceramic-containing web 20 includes woven plies of reinforcement that wrap from the trailing edge around the leading edge of the web 20. The woven plies are then suspended in a matrix material and processed into the final shape of the ceramic-containing web 20. Plenums 26, 28 are illustratively formed by the creation of gaps between the woven plies as shown, for example, in FIG. 2. The plenums 26, 28 may be pressurized with cooling air to support the ceramic-containing web 20 and to cool the airfoil 16. In some embodiments, cooling air from the plenums 26, 28 may be bled out to the suction side 29 of the airfoil 16 via optional bleed holes 80 to provide a cooling film along the suction side 29 of the airfoil 16. In other embodiments, the woven plies of reinforcement may be tubes without any seam. In still other embodiments, the ceramic-containing web 20 may be made from chopped reinforcing fibers suspended in a matrix or from a monolithic ceramic.

In the illustrative embodiment, the metallic load shield 22 is coupled to the inner platform 12 and the outer platform 14 by bicast joints 82, 84 so that load applied to the metallic load shield 22 by the ceramic-containing web 20 is passed onto the platforms 12, 14 as shown in FIG. 1. In other embodiments, the metallic load shield 22 may be coupled to the platforms 12, 14 or other structural parts included in the turbine section of a gas turbine engine via bicasting, fasteners, welding, and/or other couplers. In some embodiments, the load shield 22 may be formed to include optional bleed holes 25 that discharge cooling air out of the cooling channel 30 along the pressure side 27 of the airfoil 16.

The exemplary metallic load shield 22 comprises a high-temperature resistant superalloy adapted to withstand high operating temperatures. More specifically, the metallic load shield 22 shown in FIGS. 1-3 comprises a nickel-based or cobalt-based alloy. Specific examples of such superalloys include, but are not limited to, materials marketed under the trade names INCONEL® and WASPALOY®.

In some embodiments of the present disclosure, an optional restrictor plate 70 may be included in the vane 10 as shown in FIG. 1. The restrictor plate 70 may be arranged at an end of the cooling air inlet ports 40, 50 and may be formed to include restriction ports 71, 72 in fluid communication with the ports 40, 50. The restriction ports 71, 72 may be sized to establish pressures within the ports 40, 50 by restricting the flow cooling air supplied to the ports 40, 50 after passing through the restriction ports 71, 72.

The exemplary turbine vane assembly 10 is shown as a singlet, having one airfoil that extends between the inner platform 12 and the outer platform 14 as shown in FIG. 1. In some embodiments, a turbine vane assembly in accordance with the present disclosure may be a doublet or multi-airfoil segment, having two or more airfoils that extend between the inner platform and the outer platform. In some embodiments, a turbine vane assembly in accordance with the present disclosure may be a full ring, having an inner and/or outer platform that forms a full hoop with multiple airfoils arranged radially between the inner and outer platforms and spaced circumferentially around the full hoop(s). In some embodiments, the vane assembly 10 disclosed herein may be used in the compressor section of a gas turbine engine upon a design need for high temperature capability in the compressor.

In illustrative applications, the airfoil 16 disclosed herein may be also be incorporated into a turbine blade. In such applications, the outer platform 14 may be replaced by a blade tip and/or a blade shroud coupled to the airfoil 16. Further, a root and/or other attachment feature may be coupled to the airfoil 16 and/or the inner platform 12 to allow coupling of the airfoil 16 to a turbine disk for rotation therewith. It is also contemplated, in turbine blade applications, that the metallic load shield 22 may be integrally formed with a turbine disk to form part of a blisk assembly.

The exemplary design provides a hybrid vane 10 that employs CMC material to form one side of an otherwise fully metallic turbine vane airfoil 16. For a turbine vane 10, the airfoil 16 surface typically requires the largest amount of cooling air within the component. Thus, to replace some portion of an otherwise fully metallic airfoil with a high temperature capable ceramic material could significantly reduce the amount of cooling air required to meet component durability at higher inlet turbine gas temperatures. It would also be reasonable to describe this concept as a CMC Vane with a metallic "load shield" as the metallic skin is intended to mitigate the load carrying limitations of the CMC material. This design concept may be useful in high and moderate turbine operating temperature engine applications where at least one side of an otherwise fully metallic vane airfoil would require cooling.

This design includes an integrally constructed or fabricated metallic structure comprising the inner and outer bands (or platforms) 12, 14 as well as the Pressure Side (PS) of the airfoil 16. The CMC component 20 may be principally constructed in a representatively classic airfoil shape with opposing sides whereas the metal portion 22 of the airfoil 16 may be constructed as a metallic "skin." The metallic shield 22 would be either rigidly bonded to or integrally formed with both the inner and outer endwall (or platform) 12, 14 features to enable mechanical load transmission, generated by the "turning" of the working fluid, to the engine structure. The CMC airfoil 20 will provide some structural support to the metallic skin 22. Since the ultimate load carrying capability of CMCs may be low relative to metals, it may be recommended to employ constructions where the CMC component 20 has a larger total cross sectional area whereas the metal component 22 would be the thinner skin-like component.

In order to be used in high temperature environments, this design includes a cooling scheme. It is conceived that the airfoil cooling features 42, 52 may be integral to the metallic portion of the airfoil and would consist of two or more segregated cavities formed by the interface between the CMC airfoil body 20 and the metallic skin 22. One cavity 50 would cool the trailing portion of the metallic side and would be ejected downstream of the throat. The other cavity 40 would cool the upstream portion of the metallic side and would be ejected beyond the stagnation point at the leading edge 21 of the airfoil 16, and upstream of the throat. It is conceived that this forward-cavity air, after cooling the metallic side, may be ejected in such a way so as to form some potentially useful level of film cooling on CMC side of the airfoil. Separate CMC dedicated cooling features (e.g. film holes) may be required to avoid overheating the CMC side of the airfoil in high turbine operating temperature applications.

While the metallic skin 22 is rigidly attached to both the metallic inner and outer endwall features (platforms) 12, 14, the CMC component 20 may be constrained otherwise so as to allow the elongated airfoil 16 to thermally grow independently of the metallic skin 22 via sliding.

It is conceived that the aerodynamic loads will act directly upon the metallic pressure-side surface. The relatively high pressures associated with the cooling circuit will drive loads across the CMC body 20. It is conceived that the internal cavities 26, 28 of the CMC body 20 may be pressurized either to support suction side 29 film cooling, to manage mechanical stress, or both. Since this design includes a cooling scheme, sealing considerations must be made and/or the design must be accommodative of predicted leakages.

It is conceived that the air pressure within the cooling cavity 30 will create a force that seeks to separate the CMC from metallic skin. Therefore, there will likely be a seam at both the leading and trailing edges, where the CMC 20 and metallic skin meet 22, that will create elongated and spanwise leakage areas. Such leakages from the leading edge 21 seam may create a film, biased towards mid-span, which might prove useful, or at the very least, may not be too costly from a turbine efficiency perspective as that leakage air has already been used to extract heat from the metal skin 22. If these leakage areas are predictable at peak operating temperatures they may serve as the primary venting features, Otherwise dedicated venting features may be be needed to control pressure margin and total cooling flow consumption.

Such separation may lead to leakages across the segregation rib separating the forward and aft cooling cavities. This might be mitigated by choosing cooling features whose cooling effectiveness is less sensitive to such leakages (i.e. pins). In fact, the aft cavity could be fed from the forward cavity by purposefully moving air through the segregation rib rather than through independent inlet ports.

Due to the geometric complexity and the fact that the cooling cavities are created through an interface between materials with differing coefficients of thermal expansion, it is likely that interfaces will need to be somewhat optimized to control leakages at key operating conditions. This could either be at a maximum turbine operating temperature condition or another condition where the engine might operate for a large portion of its duty cycle.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane for use in a gas turbine engine, the turbine vane comprising
   an inner platform,
   an outer platform spaced from the inner platform, and
   an airfoil that extends from the inner platform to the outer platform, the airfoil including a ceramic-containing web that forms a suction side of the airfoil and a metallic load shield that forms a pressure side of the airfoil,
   wherein the metallic load shield is arranged adjacent to the ceramic-containing web to form a cooling channel between the ceramic-containing web and the metallic load shield that extends over the entire distance from the inner platform to the outer platform and from a leading edge of the airfoil to a trailing edge of the airfoil.

2. The turbine vane of claim 1, wherein the metallic load shield is formed to include a first cooling air inlet port defined by a first thinned section of the metallic load shield that extends from at least one of the inner platform and the outer platform to the cooling channel and sized to conduct cooling air to the cooling channel during use of the turbine vane.

3. The turbine vane of claim 2, wherein the first cooling air inlet port is arranged in a midspan region of the airfoil between the leading edge and the trailing edge of the airfoil at a location exposed to high temperatures when the turbine vane is used.

4. The turbine vane of claim 3, wherein the metallic load shield includes cooling features arranged in the first cooling air inlet port that increase surface area of the metallic load shield along the first cooling air inlet port so that heat is dissipated through the cooling features by cooling air flowing through the first cooling air inlet port.

5. The turbine vane of claim 4, wherein the cooling features include at least one of ribs, pins, slots, and bumps.

6. The turbine vane of claim 2, wherein the metallic load shield is formed to include a second cooling air inlet port, spaced apart from the first cooling air inlet port, defined by a second thinned section of the metallic load shield that extends from at least one of the inner platform and the outer platform to the cooling channel and sized to conduct cooling air to the cooling channel during use of the turbine vane.

7. The turbine vane of claim 6, wherein the first cooling air inlet port and the second cooling air inlet port are arranged in a midspan region of the airfoil between the leading edge and the trailing edge of the airfoil at locations exposed to high temperatures when the turbine vane is used.

8. The turbine vane of claim 7, wherein the metallic load shield includes cooling features arranged in the first cooling air inlet port and in the second cooling air inlet port that increase surface area of the metallic load shield along the first and the second cooling air inlet ports so that heat is dissipated through the cooling features by cooling air flowing through the first and the second cooling air inlet ports.

9. The turbine vane of claim 6, further comprising a restrictor plate arranged at the end of the first cooling air inlet port and the second cooling air inlet port adjacent to the inner platform or the outer platform, the restrictor plate formed to include a first restriction port in fluid communication with the first cooling air inlet port and sized to cause a first pressure to be established within the first cooling air inlet port by cooling air supplied to the first cooling air inlet port, and the restrictor plate formed to include a second restriction port in fluid communication with the second cooling air inlet port and sized to cause a second pressure to be established within the second cooling air inlet port by cooling air supplied to the second cooling air inlet port.

10. The turbine vane of claim 1, wherein a leading edge interface of the metallic load shield and the ceramic-containing web is arranged to discharge cooling air from the cooling channel at a location that creates a cooling air film along at least a portion of the suction side of the airfoil during use of the turbine vane in the gas turbine engine.

11. The turbine vane of claim 10, wherein a trailing edge interface of the metallic load shield and the ceramic-containing web is arranged to discharge cooling air from the cooling channel along the trailing edge of the airfoil during use of the turbine vane in the gas turbine engine.

12. The turbine vane of claim 1, wherein the metallic load shield is formed to include bleed holes that extend from the cooling channel to the pressure side of the airfoil to conduct cooling air out of the cooling channel during use of the turbine vane in the gas turbine engine.

13. An airfoil adapted for use in a gas turbine engine, the airfoil comprising
a ceramic-containing web that forms a suction side of the airfoil, and
a metallic load shield that forms a pressure side of the airfoil,
wherein the metallic load shield is arranged adjacent to the ceramic-containing web to form a cooling channel between the ceramic-containing web and the metallic load shield that extends from a leading edge of the airfoil to a trailing edge of the airfoil.

14. The airfoil of claim 13, wherein the metallic load shield is formed to include a first cooling air inlet port defined by a first thinned section of the metallic load shield that extends from at least one of an inner platform and an outer platform to the cooling channel and sized to conduct cooling air to the cooling channel.

15. The airfoil of claim 14, wherein the first cooling air inlet port is arranged in a midspan region of the airfoil between the leading edge and the trailing edge of the airfoil at a location exposed to high temperatures when the turbine vane is used.

16. The airfoil of claim 14, wherein the metallic load shield is formed to include a second cooling air inlet port, spaced apart from the first cooling air inlet port, defined by a second thinned section of the metallic load shield that extends from at least one of the inner platform and the outer platform to the cooling channel and sized to conduct cooling air to the cooling channel during use of the turbine vane.

17. The airfoil of claim 16, wherein the first cooling air inlet port and the second cooling air inlet port are arranged in a midspan region of the airfoil between the leading edge and the trailing edge of the airfoil at locations exposed to high temperatures when the turbine vane is used.

18. The airfoil of claim 17, wherein the metallic load shield includes cooling features arranged in the first cooling air inlet port and in the second cooling air inlet port that increase surface area of the metallic load shield along the first and the second cooling air inlet ports so that heat is dissipated through the cooling features by cooling air flowing through the first and the second cooling air inlet ports.

19. A method of assembling a turbine vane for use in a gas turbine engine, the method comprising
arranging a ceramic-containing web adjacent to a metallic load shield so that the ceramic-containing web and the metallic load shield cooperate to form an airfoil, and
coupling the airfoil to an inner platform and an outer platform so that the airfoil extends across a gas path defined between the inner platform and the outer platform,
wherein the metallic load shield is arranged relative to the ceramic-containing web to form a cooling channel between the ceramic-containing web and the metallic load shield that extends over the entire distance from the inner platform to the outer platform and from a leading edge of the airfoil to a trailing edge of the airfoil.

20. The method of claim 19, wherein the ceramic-containing web forms a suction side of the airfoil and the metallic load shield forms a pressure side of the airfoil.

* * * * *